April 12, 1932. M. ENGELMANN 1,853,674
MICROSCOPE WITH INCLINED OCULARS
Filed Oct. 15, 1930 2 Sheets-Sheet 2
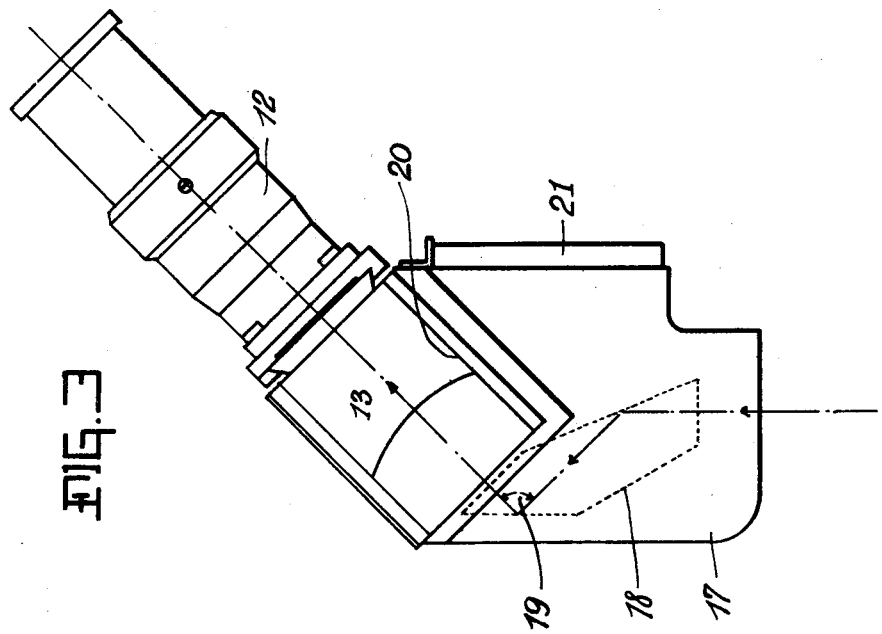
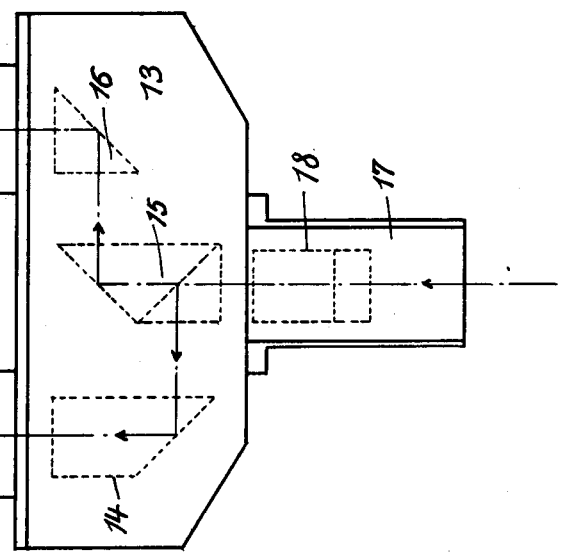
Max Engelmann INVENTOR
BY ATTORNEY
Ivan E. A. Konigsberg Patented Apr. 12, 1932

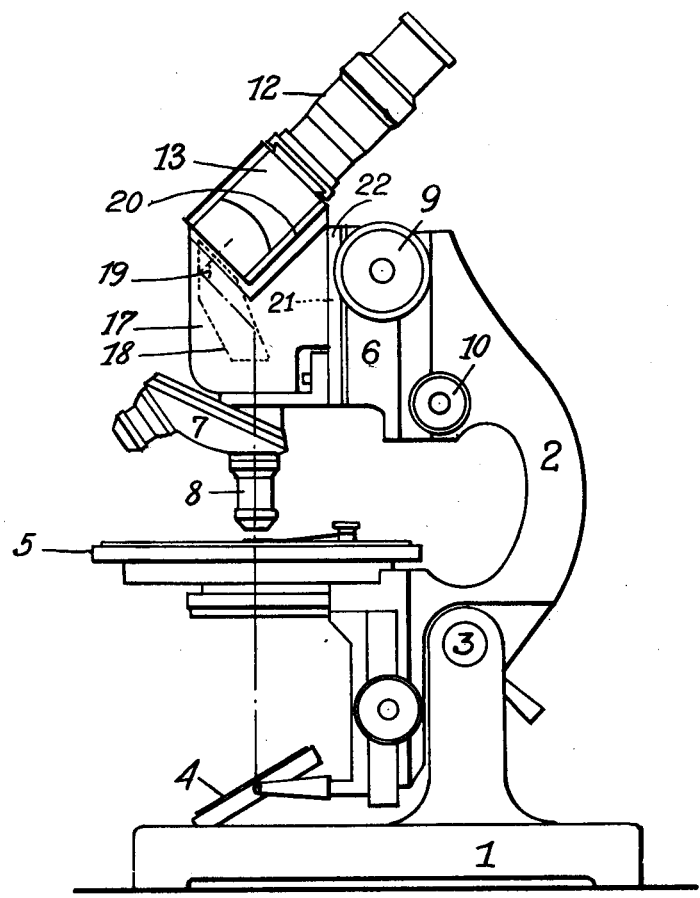

1,853,674

UNITED STATES PATENT OFFICE

MAX ENGELMANN, OF WETZLAR, GERMANY, ASSIGNOR TO THE FIRM ERNST LEITZ, OPTISCHE WERKE, OF WETZLAR, GERMANY

MICROSCOPE WITH INCLINED OCULARS

Application filed October 15, 1930, Serial No. 488,723, and in Germany June 4, 1930.

The object of this invention is to provide a microscope with inclined observation tubes so arranged that it may be used for monocular as well as for binocular observation and whereby the usual practise in operating a microscope is adhered to. The observation tubes are inclined rearwardly towards the back of the microscope leaving the front and sides free from obstructions.

Another object of the invention is to provide a microscope in which the inclined binocular observation tubes are detachable and interchangeable with an inclined monocular observation tube and vice versa, and in which the usual microscope construction as to frame, stage, eyepieces and reflector remain undisturbed thus greatly facilitating the use of the instrument.

The invention is embodied in a microscope with inclined observation tubes arranged and constructed as hereinafter set forth and as illustrated in the accompanying drawings in which Fig. 1 is a side view of a microscope with inclined observation tubes, the appearance of which is the same whether monocular or binocular tubes are used.

Fig. 2 is a diagrammatic view illustrating the system of prisms used.

Fig. 3 shows the observation tube element detached from the microscope.

Referring to Figure 1 the microscope comprises the usual base 1 to which the frame 2 is pivoted at 3. The frame carries the reflector 4 and a stage 5. The numeral 6 denotes the usual eye piece bracket which carries the eye piece element 7 having objectives 8 of any usual or standard construction. 9 and 10 denote the screws for vertical adjustment and focussing purposes. All of the foregoing parts and elements are of usual standard microscope construction well known in the art.

The numerals 12, 12 denote the binocular observation tubes which are carried by an upper prism holder 13 which contains and supports a system of prisms 14, 15, 16 arranged in known manner. The upper prism holder is according to this invention detachably carried by a lower prism holder 17 which supports an additional prism 18 adapted to reflect the vertical rays passing upwards from the objective 8 rearwardly and upwardly at an angle 19, see Figure 3.

Referring to Figures 1 and 3 it will be seen that the upper prism holder 13 rests in and on an angular saddle 20 formed by and in the lower prism holder 17, the connection being the well known tongue and groove construction not illustrated. The upper prism holder is readily detached from the lower prism holder by a simple upwards sliding movement and may be substituted by a monocular observation tube of known construction and therefore not illustrated because to do so would be an unnecessary duplication of Figure 1, the side appearance of the microscope with a monocular tube being practically the same as with binocular tubes.

The lower prism holder 17 is provided with a vertical tongue 21, Figure 2, adapted to be inserted by a vertical sliding movement in ways 22 formed in the eyepiece bracket 6, Figure 1. It is obvious therefore that the prism holders 13 and 17 arranged for binocular tubes as in Figure 3 may be detached from the microscope and be replaced with monocular or binocular vertical observation tubes.

Also, that the upper prism holder with inclined binocular tubes may be detached from the lower prism holder and a binocular inclined tube substituted.

It is thought that the foregoing description together with the drawings clearly disclose the invention, constructional details being of such well known forms and design that no specific illustration or description is deemed necessary.

Figure 1 clearly shows that this invention does not compel any change in operation or use of a microscope with inclined or vertical observation tubes. This is a material advantage and increases the usefulness of the instrument. It is also economical in that, except for the prism holders, known microscope parts and patterns may be used. A microscope according to this invention may be used with vertical monocular or vertical binocular tubes, or with inclined monocular or inclined binocular tubes by providing four tube attachments. This is an obvious advantage.

I claim:—

1. In a microscope, a supporting stand, a lower prism holder detachably mounted on said stand in vertically slidable adjustable relation thereto, an upper prism holder including either monocular or binocular observation tubes, means for detachably supporting said upper prism holder in an inclined position on said lower prism holder whereby to support either monocular or binocular observation tubes on said lower prism holder and a prism in the latter for reflecting vertical rays into the said observation tubes.

2. In a microscope, a supporting stand, a lower prism holder detachably mounted on said stand in vertically slidable adjustable relation thereto, an upper prism holder including either monocular or binocular observation tubes, said lower prism holder having an angularly disposed saddle for receiving said upper prism holder and supporting the same in a rearwardly inclined position and a single prism in said lower prism holder for reflecting vertical rays into the said observation tubes.

Signed at Frankfort-on-the-Main, Germany, this 3d day of October, A. D. 1930.

MAX ENGELMANN.